Figure 15:
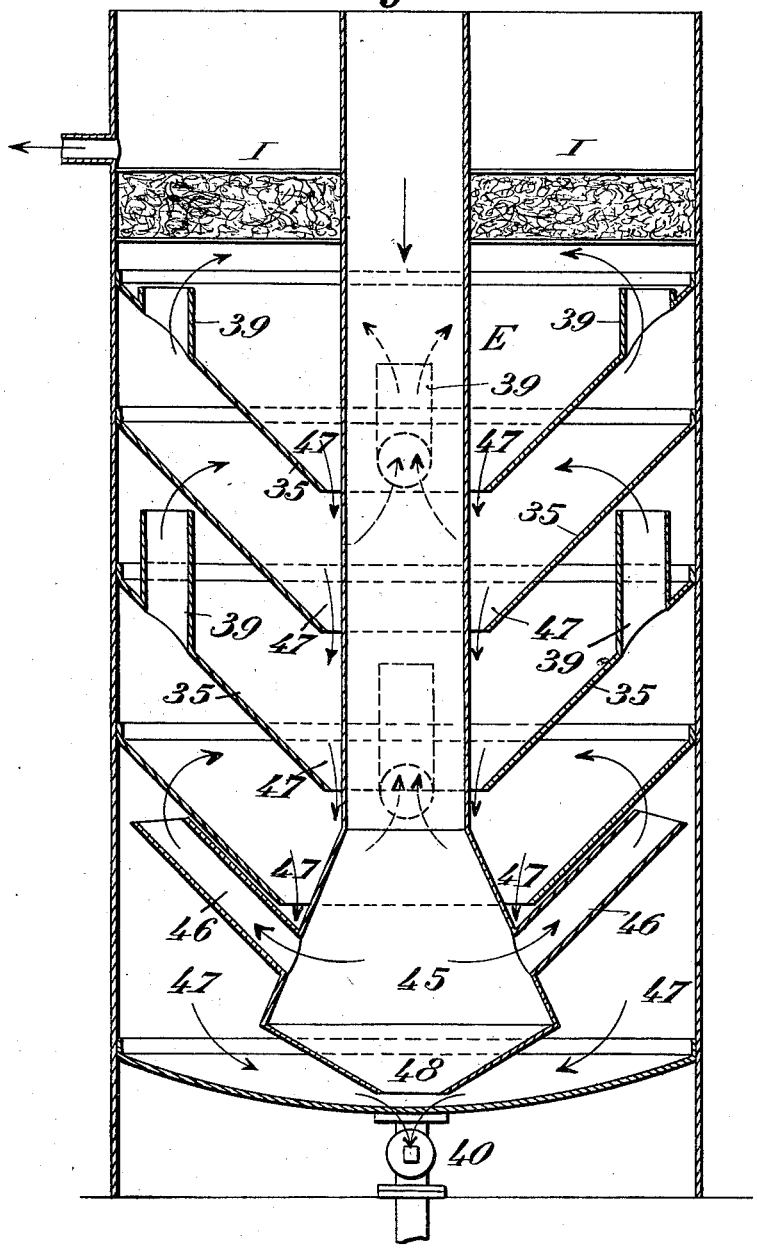

No. 731,346. PATENTED JUNE 16, 1903.
E. DELMOULY.
WATER PURIFIER.
APPLICATION FILED JULY 23, 1902.
NO MODEL. 6 SHEETS—SHEET 1.
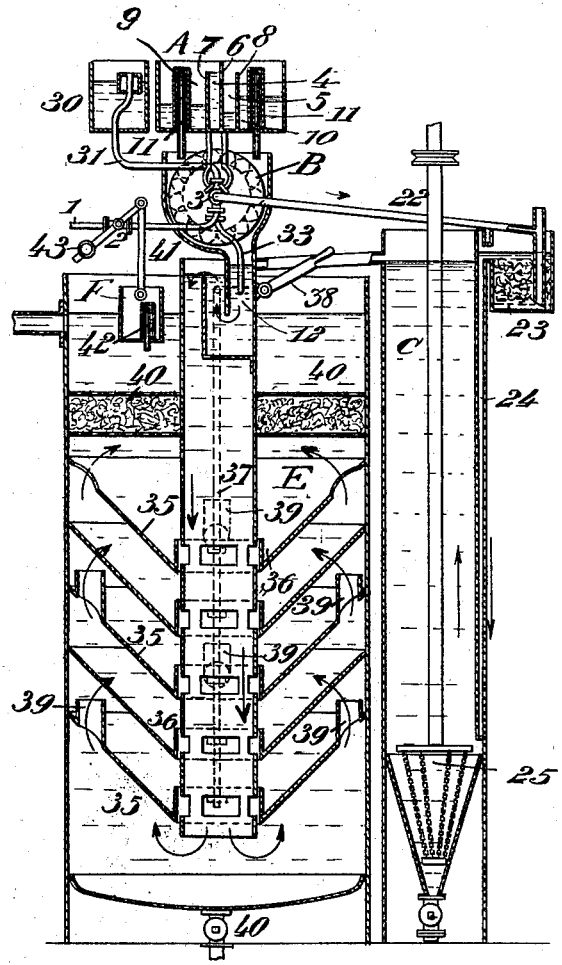
Fig.1.
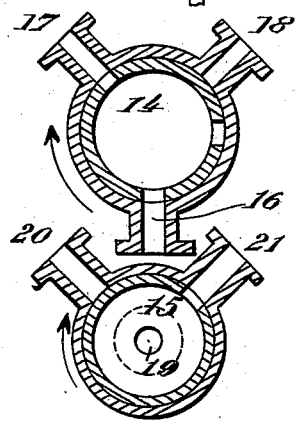
Fig.7
Fig.8
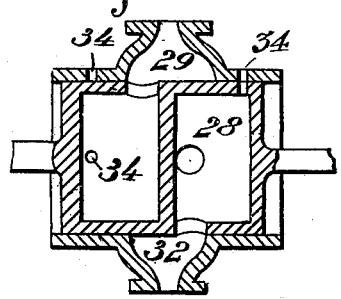
Fig.3.
Witnesses
E. Haunsch
L. Waldman
Inventor
Elvi Delmouly
by J. Singer
Attorney.

No. 731,346. PATENTED JUNE 16, 1903.
E. DELMOULY.
WATER PURIFIER.
APPLICATION FILED JULY 23, 1902.
NO MODEL. 5 SHEETS—SHEET 2.
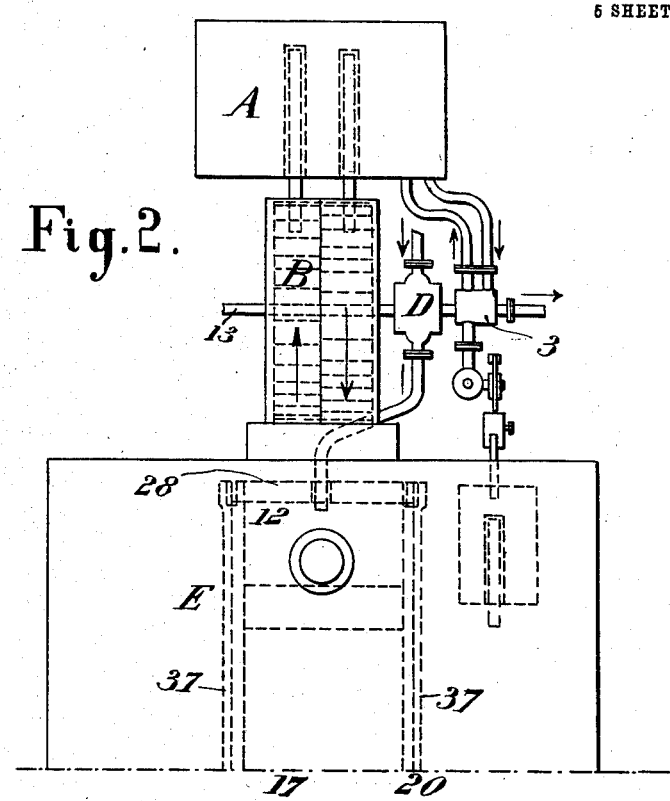
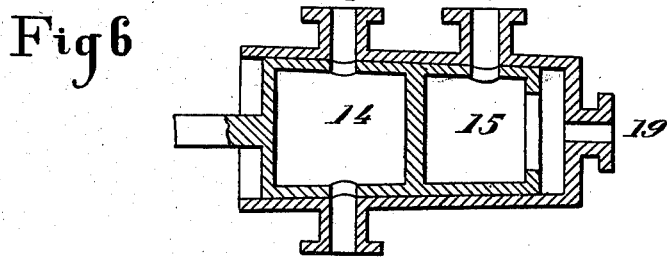
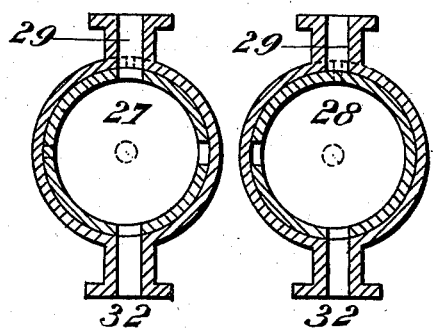
Witnesses
E. Hanusch
L. Waldman
Inventor
Eloy Delmouly
by B. Singer
Attorney No. 731,346. PATENTED JUNE 16, 1903.
E. DELMOULY.
WATER PURIFIER.
APPLICATION FILED JULY 23, 1902.
NO MODEL. 5 SHEETS—SHEET 3.
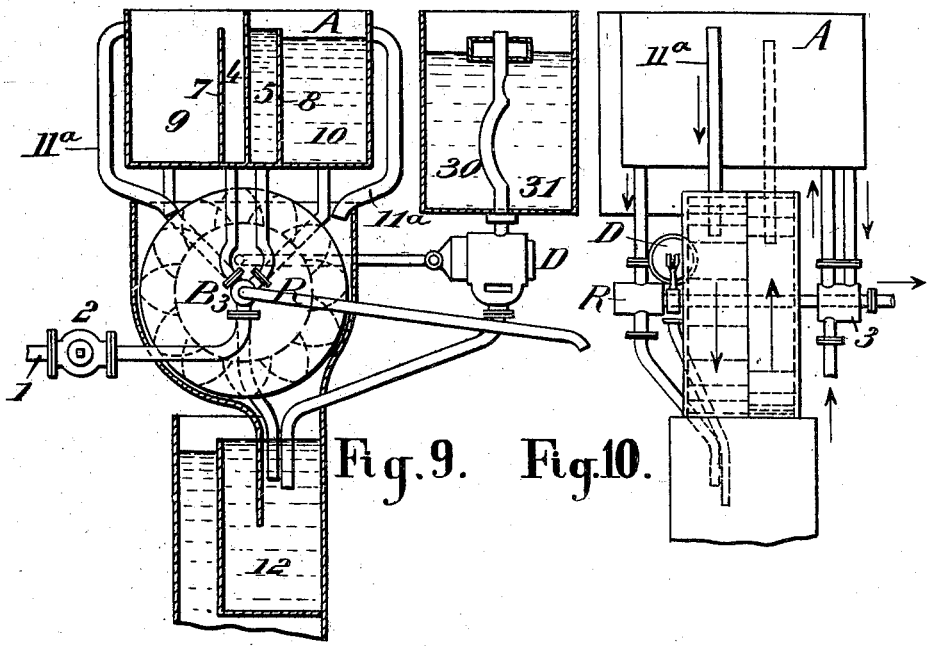
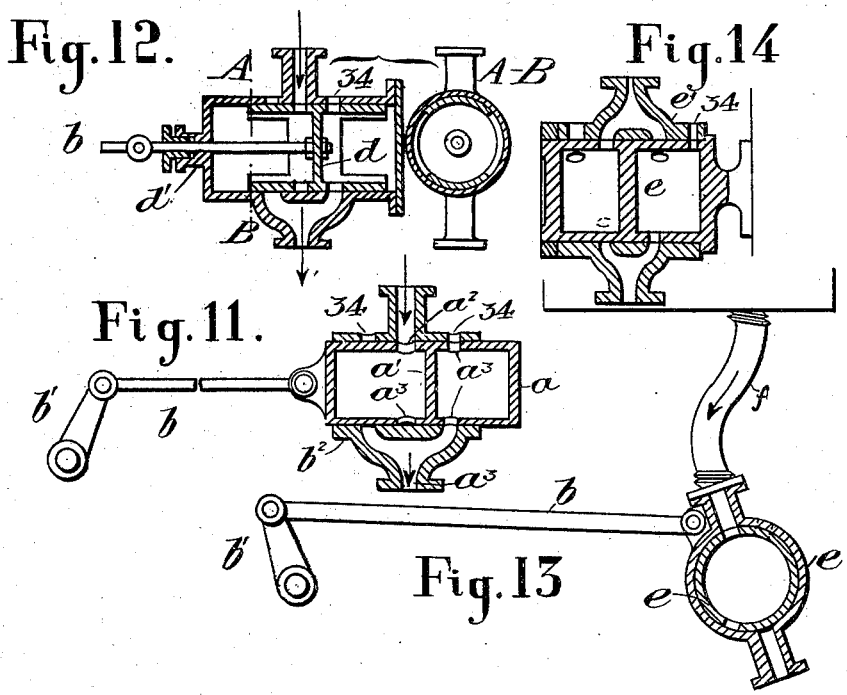

No. 731,346. PATENTED JUNE 16, 1903.
E. DELMOULY.
WATER PURIFIER.
APPLICATION FILED JULY 23, 1902.
NO MODEL. 5 SHEETS—SHEET 4.

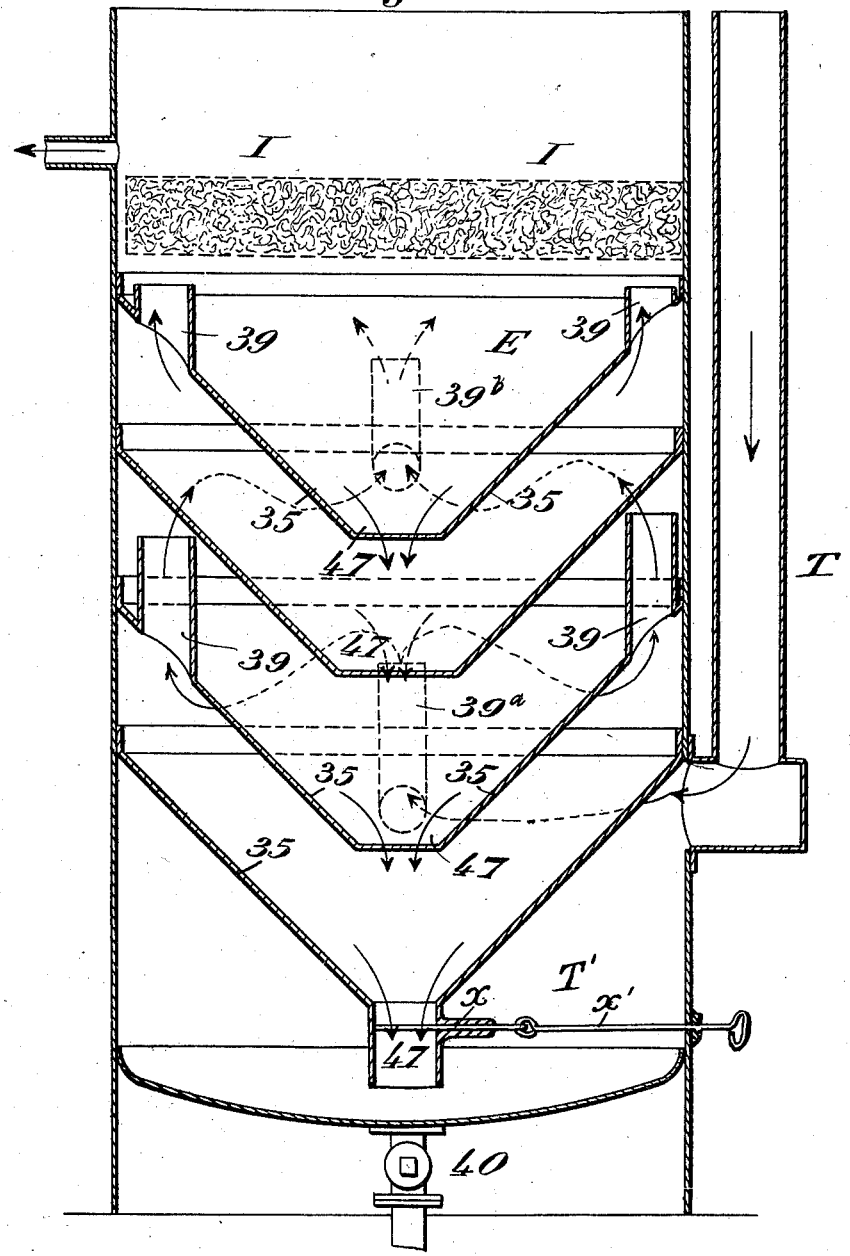

No. 731,346. Patented June 16, 1903.

UNITED STATES PATENT OFFICE.

ELOI DELMOULY, OF PARIS, FRANCE.

WATER-PURIFIER.

SPECIFICATION forming part of Letters Patent No. 731,346, dated June 16, 1903.

Original application filed April 21, 1902, Serial No. 103,941. Divided and this application filed July 23, 1902. Serial No. 116,644. (No model.)

*To all whom it may concern:*

Be it known that I, ELOI DELMOULY, a citizen of the French Republic, and a resident of Paris, France, have invented certain new and useful Improvements in Water-Purifiers, of which the following is a specification, this application being a division of my prior application filed April 21, 1902, under Serial No. 103,941, and issued February 3, 1903, No. 719,761.

This invention relates to an improved purifier for drinking-water, steam-boilers, and water generally used in industry in which the water which flows in according to requirements receives the quantities of reagents determined by the previous analysis and flows out purified, leaving at the bottom of the apparatus the impurities precipitated by the reagents.

In the accompanying drawings, furnished by way of example, Figure 1 is a vertical section of the apparatus; Fig. 2, a partial view in elevation. Figs. 3, 4, and 5 are various sections of the device for proportioning the reagents. Figs. 6, 7, and 8 are various sections of a special distributing-cock; Figs. 9 and 10, modifications of different parts of the apparatus. Figs. 11, 12, 13, and 14 represent modified forms of dosers. Fig. 15 is a modification of the decanter, and Fig. 16 still a further modification thereof.

Referring to Figs. 1 and 2, the apparatus comprises substantially the gaging-tank A for holding the water to be purified, a special distributing-cock 3, a double water-wheel B, a saturater C, a doser D for the reagent, a decanting-reservoir E, furnished with detachable arrangements for facilitating the decanting, a filter I, and a special float F, automatically starting and stopping the apparatus. These parts are combined to form a complete apparatus. The water to be purified enters through the pipe 1, the stop-cock 2, and the distributing-cock 3, which conveys it to one or the other of the compartments forming a gaging-tank A, which is arranged above the said distributing-cock. Each of the two compartments of the gaging-tank, separated by a partition 6, is of the same capacity, and the said partition rises above the level to which the water can ascend in the two compartments. Each of these compartments is subdivided into unequal compartments 4 9 or 5 10 by partitions 7 and 8. The compartments 4 and 5 alternately and directly receive the water coming from the cock 3, and the water flows into the one or the other, according to the position assigned to it. When these compartments 4 and 5 are sufficiently full, the water flows over the partitions 7 and 8 into the compartments 9 and 10, which it fills to an extent fixed for automatically starting the siphons 11 11. Each of these siphons is composed of two concentric tubes. The tube of small diameter is fixed to the bottom of the tank A, below which it extends, and the tube of larger diameter, which is closed at the top, is held at a certain distance from the bottom of the tank. The water which flows into the compartment 9 or 10 rises between the two pipes, then flows through the inner pipe, effecting the automatic action of the siphon, and consequently the emptying of the corresponding compartment 9 or 10, the liquid from which flows over the floats of a double water-wheel, which it sets in motion. This wheel is composed of two ordinary wheels joined together, mounted on the same shaft, their floats being arranged in opposite directions, each wheel forming one-half of the whole arrangement. The water then falls into a mixing-tank 12, effecting the mixing of the reagent with the water to be purified. One of the halves of the double water-wheel corresponds to one of the siphons, and the floats of the one wheel being arranged in an opposite direction to those of the other the flow of water through one of the siphons produces a movement of this wheel inverse to that produced by the flow of water through the other siphon. The rotary movement is thus alternating. It is regulated by two stops suitably arranged, which restrict it to a fraction of a rotation. The floats are perforated, so as to insure the complete emptying of the "ladles."

Fig. 2: On the shaft 13 of the wheel B are mounted the reagent-doser D and the special distributing-cock 3. This cock, Figs. 6, 7, 8, has its plug divided into two distinct compartments 14 15. The compartment 14 serves the ways 16 17 18. The way 16 is in constant communication with the water-inlet pipe 1, and the ways 17 18 communicate alternately with the compartments 4 and 5. The second compartment 15 of this cock in the same manner establishes the communication of the three ways 19 20 21. The ways 20 21 are alternately opened and closed and serve for emptying the compartments 4 and 5 through the way 19 (which is constantly open) and the tube 22 into the lime-tank 23. The action of this cock is such that the compartment 4 empties while the compartment 5 fills, and vice versa. This operation corresponds to the simultaneous emptying and filling of the two halves of the gaging-tank A. The water, after having passed into the lime-tank 23, circulates in the saturater C, where it is saturated. For this purpose the water flows toward the bottom of the saturater by an overflow 24 and is there stirred up with the lime by a stirrer 25, operated by a vertical shaft actuated by any suitable means. This stirring of the lime, which is deposited in the conical part of the saturater, effects the saturation of the water, which rises to the top of the said saturater, where it arrives perfectly decanted and flows through a pipe into the mixing-tank 12.

Figs. 9 and 10 represent another method of emptying the gaging-tank A. By this arrangement the siphons are dispensed with and replaced by two pipes $11^a$. These pipes pour the overflow from the gaging-tank A onto the floats of each corresponding half of the double water-wheel. This is set in motion in the corresponding direction and operates a three-way emptying-cock R, which conveys the water from the compartments 9 and 10 into the mixer.

In certain cases the lime may be dispensed with as a reagent. In such case the compartments 4 and 5 of the gaging-tank A, Fig. 1, are omitted, and consequently the partitions 7 and 8. The gaging-tank has thus only two simple compartments, and the simultaneous filling and emptying may be effected by a suitable combination of the parts described above.

The reagent-doser D, Figs. 3, 4, 5, has two separate compartments 27 28, the capacity of each of which corresponds to the quantity of reagent to be employed for the water contained in each half of the gaging-tank A. The nozzle 29 effects the communication of the doser with the reagent-reservoir 30 through the pipe 31, and the nozzle 32 serves for the flow of the proper quantity of the reagent into the mixer 12 by the pipe 33, air-holes 34 being formed in the sides to insure the regular flow of the liquid. By examining Fig. 2 it will be readily seen that the doser being mounted on the same shaft as the special cock 3 is actuated like it with an alternating rotary motion.

Figs. 11, 12, 13, 14 represent other forms of dosers. That represented by Fig. 11 is composed of a hollow piston $a$, closed at its two ends and divided into two compartments by a transverse partition $a'$. This piston receives its alternating rectilinear motion from the water-wheel by the action of a connecting-rod $b$ and a crank $b'$ and works in a casing $b^2$. Suitably-located openings $a^2$ $a^2$ enable the alternate and simultaneous filling and emptying of the two compartments of the doser to be effected. In Fig. 12 the piston $d$ is grooved and open at each end and moves in the interior of a cylinder $d'$ analogous to that of a steam-engine. As in the preceding case, the openings are arranged so as to effect an easy and suitable distribution of the reagent. Figs. 13 and 14 show an arrangement which is only a modification of the distributer shown in Fig. 11. The cylinder $e$, with two compartments, is fixed, while its casing $e'$ is movable and insures the distribution of the reagent. A flexible tube $f$ connects the movable casing with the tank containing the reagent solution. As many dosers may be employed as the number of reagents would require.

In all cases when lime is employed as a reagent the mixing-tank receives at the same time, first, the water to be purified, which comes from the siphons through the water-wheel; second, the solution coming from the reagent-doser; third, the water saturated with lime, coming from the saturater. The mixture of water to be purified and the reagent descends through a central tube arranged under the mixing-tank 12 to the lower part of the decanter E, where the precipitation of the calcareous salts, magnesia salts, and others, if any, begins. The water then ascends through a series of cone trunks 35, intended to arrest and receive the deposit. The trunks are supported and adjusted by the periphery of their large base on the inner wall of the decanter, and the cones are supported by their small base on the central tube, which has openings connecting with the lower part of said cones. Movable rings 36, connected with the rods 37, are operated from the outside of the apparatus by means of the fork-lever 38 and may be placed either on the outside of the central tube, as shown in Fig. 1, or on the inside of this tube. It will be readily understood that the rings being raised the deposits will fall into the central tube and from there to the bottom of the decanter, from which they will be removed by the emptying-cock 40.

Fig. 15 shows another form of decanter. In this arrangement the cones which collect the deposits are constructed in the same manner as in the decanter first described—that is to say, they have passages arranged quincuncially and leaving on their lower parts through their small bases annular spaces around the central tube. This latter terminates at the bottom in a sort of box formed of two cone trunks, with their large bases opposite each other. On the sides of the upper cone trunk of this box passages 46 46 are arranged, the upper apertures of which open above the plane of the small base of the lowest cone trunk, serving to retain the precipitated deposits. In this manner the water conveyed through the central tube rises in the decanter through the passages 46 46, following the direction indicated by the arrows, and passing through the other passages 39. As these latter are arranged quincuncially, the deposits, while the water is passing between two passages, fall in the cone and reach the lower part thereof, then pass through the constantly-open annular space. In a word, they take the course indicated by the arrows 47, which is the reverse direction to that followed by the water to be decanted. Then they fall to the bottom of the decanter, whence they are removed by the emptying-cock 40. The hole 48, formed in the bottom of the biconical box 45, serves for expelling the deposits formed in this box. In this arrangement there is no closing apparatus for insuring the passage of the water to be decanted, and the deposits fall to the bottom of the decanter continuously and automatically. The feature of this arrangement thus consists in the position of the upper openings of the passages 46 and 39, which openings must always be above the plane of the openings forming the small bases of the cone trunks 40 in order to insure the circulation of the water to be decanted and to prevent its mixing with the deposits reconducted toward the central part by these cone trunks.

Fig. 16 is a modification of the preceding decanter. The inlet-tube T for the water is placed outside and opens into the side of the decanter near the large upper base of the lower cone trunks. The biconical box is omitted, and the water to be decanted runs in the direction indicated by the arrows—to wit, from the lowermost or precipitating chamber T' through passages 39$^a$, opening through the wall of the lowermost cone 35, into the top of the chamber thereabove, thence through passages 39 into the chamber above the second cone, thence again through passages 39$^b$ into the top of the chamber above the third cone, and from this through passages 39 into the chamber above the fourth cone immediately beneath the filter, and the deposits fall again to the bottom of the cone trunks, then to the bottom of the decanter, as may be easily seen by examination of Fig. 16. For the purpose of better effecting the circulation of the water coming to the side of the decanter through the pipe T the lower opening of the lowest cone trunk may be furnished with a closing device, such as a valve $x$ with rod $x'$, capable of being worked from outside.

The stopping or starting of the apparatus is effected by means of a special float F. (Shown in Fig. 1.)

I reserve the right to modify the various parts to adapt them best to their required use and to employ any or all of them alone or in any suitable combination so long as the principle of the invention is retained.

I do not herein claim the combination, with a conduit supplying the water to be purified, of a measuring-tank and a settling-tank furnished with movable ring-plates, such being embraced in my above-mentioned application, of which this is a division; but What I do claim, and desire to secure by Letters Patent, is—

1. In an apparatus for purifying water, the combination of a water-tank divided into two measuring-compartments, a mixing-tank to which the compartments alternately deliver, an oscillatory double water-wheel, having the floats of one section set reversely to the floats of the other section, interposed between the water-tank and the mixing-tank, a discharge from the first compartment of the water-tank over one section of the water-wheel, a discharge from the second compartment over the other section, a three-way distributing-cock connected with the water-supply pipe and with each of said compartments, and connections between said cock and the oscillatory water-wheel, whereby the ports leading to said compartments are alternately opened and closed to fill one compartment while the other is being emptied, and vice versa.

2. In an apparatus for purifying water, the combination of a water-tank divided into two measuring-compartments, a mixing-tank to which the compartments alternately deliver, an oscillatory double water-wheel, having the floats of one section set reversely to the floats of the other section, interposed between the water-tank and the mixing-tank, a discharge from the first compartment of the water-tank over one section of the water-wheel, a discharge from the second compartment over the other section, a reagent-distributer connected with the water-tank and mixing-tank and connections between said reagent-distributer and the oscillatory wheel, whereby the distributer is operated each time a compartment is emptied.

3. In an apparatus for purifying water, the combination of a water-tank divided into two measuring-compartments, a mixing-tank to which the compartments alternately deliver, an oscillatory double water-wheel, having the floats of one section set reversely to the floats of the other section, interposed between the water-tank and the mixing-tank, a discharge from the first compartment of the water-tank, over one section of the wheel, a discharge from the second compartment over the other section, a three-way distributing-cock connected with the supply-pipe and with each of said compartments, a reagent-distributer connected with the water and mixing tanks, and connections between said water-wheel and the cock and reagent-distributer, whereby the cock is caused to fill the compartments alternately and the reagent-distributer operated as each compartment is emptied.

4. In an apparatus for purifying water for steam-generators and for other purposes the combination with a conduit supplying the water to be purified, a measuring-tank, a reagent-distributer, and means for introducing air to facilitate the discharge, substantially as described and shown.

In testimony whereof I have hereunto set my hand in presence of two witnesses.

ELOI DELMOULY.

Witnesses:
ADOLPHE STURM,
EDWARD P. MACLEAN.